United States Patent [19]

Moore

[11] 4,197,392

[45] Apr. 8, 1980

[54] MELAMINE COATINGS

[75] Inventor: James E. Moore, Clifton Park, N.Y.

[73] Assignee: General Electric Company, Schenectady, N.Y.

[21] Appl. No.: 935,590

[22] Filed: Aug. 21, 1978

[51] Int. Cl.$^2$ .............................................. C08G 12/32
[52] U.S. Cl. .................................... 528/127; 528/128; 528/229; 528/254; 260/45.8 NT; 525/509
[58] Field of Search ............... 528/127, 128, 221, 229, 528/254; 260/45.8 NT, 45.95 F, 45.95 C

[56] References Cited

U.S. PATENT DOCUMENTS

| | | | |
|---|---|---|---|
| 3,200,086 | 8/1965 | Coleman | 528/221 X |
| 3,429,841 | 2/1969 | Pollock et al. | 260/45.95 F X |
| 3,496,136 | 2/1970 | Susi et al. | 260/45.8 NT |
| 3,892,889 | 7/1975 | Cohnen et al. | 260/45.95 F X |

Primary Examiner—Wilbert J. Briggs, Sr.
Attorney, Agent, or Firm—William A. Teoli; James C. Davis, Jr.

[57] ABSTRACT

Ultraviolet resistant transparent coatings are provided formed of (A) a melamine nucleus compound, (B) a benzophenone and preferably (C) a polyol. The compositions are effective in protecting polycarbonate resins and other UV degradable materials.

14 Claims, No Drawings

MELAMINE COATINGS

BACKGROUND OF THE INVENTION

Polymeric ultraviolet light absorbers are especially desirable in thin films of between about 0.05 mils and about 0.5 mils since monomeric absorbers are readily lost by diffusion, and solvent leaching because of the high surface area in relation to the volume of material employed. The preparation of polymeric UV-absorbers usually involves the vinyl polymerization of substituted UV-screeners such as (2-hydroxy-4-methacryloxybenzophenone) or the condensation polymerization of properly substituted UV-screeners such as 2-hydroxybenzophenone-4,4'-dicarboxylic acid with glycols or 2-hydroxy-4,4'-bishydroxymethyl benzophenone with diacids.

It has now been discovered that improved polymeric films can be formed from a melamine nucleus compound, a benzophenone and preferably a polyol. Moreover, the benzophenone appears to be incorporated in the polymer as indicated by long term thermal aging tests, which renders the transparent coating ideally suited for protecting transparent polycarbonates, and other UV degradable materials.

BRIEF DESCRIPTION OF THE INVENTION

Ultraviolet resistant surface coatings are provided of a transparent copolymer of (A) a melamine nucleus compound of the formula,

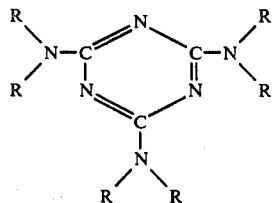

wherein the R groups are independently selected from H, —CH$_2$OH, and —CH$_2$O(CH$_2$)$_x$H, wherein x is an integer of from 1 to 4; and a stabilizing amount (B) of a benzophenone of the formula,

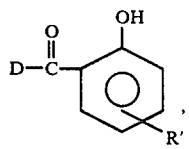

wherein R' is selected from —OH and —NH$_2$ groups in the 3,4 or 5 positions of the ring, and D is an aromatic radical of less than 4 six membered rings which can be substituted with —OH and —NH$_2$ groups; and preferably (C) a polyfunctional compound containing at least two hydroxyl groups. The coatings are particularly well suited for protecting polycarbonate resins and other UV light degradable materials.

DETAILED DESCRIPTION OF THE INVENTION

Melamine nucleus compounds which can be employed in the invention are those of the above formula wherein the R groups can be methoxymethyl, ethoxymethyl, propoxymethyl, or butoxymethyl and hydrogen. Preferably the R groups are all the same and are alkoxymethyl.

The polyfunctional compound containing at least two hydroxyl groups can be aromatic or aliphatic. Representative aromatic compounds are phenols which include resorcinol, 2,2'-methylenediphenol, 2,4-methylenediphenol, 4,4'-isopropylidenediphenol, 4,4'-(cyclohexylidene)diphenol, and 4,4'-dihydroxydiphenol, and 4,4'-dihydroxydiphenylsulfone. Representative aliphatic compounds are alcohols which include ethylene glycol, diethylene glycol, triethylene glycol, tetraethylene glycol, propylene glycol, 1,3-propanediol, 1,4-butanediol, 1,5-pentanediol, 1,2,3-propanetriol, pentaerythritol and sorbitol. In addition, the polyfunctional hydroxyl compound can be an alkyd resin, such as a hydroxyl containing epoxy resin, a soluble cellulose derivative, a vinyl polymer having free hydroxyl groups, such as poly(vinyl alcohol) or partial saponified poly (vinyl acetate). The polyfunctional hydroxyl compound (e.g. polyol) can also contain carboxyl and amine groups but should contain at least two hydroxyl groups.

Among the dihydroxybenzophenones of the above formula which can be employed are the following:
2,3-dihydroxybenzophenone,
2,4-dihydroxybenzophenone,
2,5-dihydroxybenzophenone,
2,3'-dihydroxybenzophenone,
2,4'-dihydroxybenzophenone,
2-hydroxy-5-aminobenzophenone,
2-hydroxy-4'-aminobenzophenone,
2,2',4,4'-tetrahydroxybenzophenone,
2,2',3,3'-tetrahydroxybenzophenone,
2,2',5,5'-tetrahydroxybenzophenone,
dihydroxynaphthophenones,
dihydroxyanthrophenones,
dihydroxydinaphthoketones,
dihydroxyanthrones, etc.

The preferred compounds are where D is a substituted or unsubstituted benzene ring.

The benzophenone should be used in an amount sufficient to reduce the UV light degradation. Generally, from about one to about five percent by weight of the composition is sufficient.

The benzophenone can be reacted solely with the melamine nucleus compound but preferably a polyol is employed such as described in the specification. Generally, the melamine nucleus compound will constitute from about 20 to about 80 percent of the mixture and the polyol the remainder, exclusive of the benzophenone.

In order to form the UV light resistant composition and apply it to a suitable substrate, the reactants can be dissolved or suspended in a suitable solvent such as n-butanol, ethanol and the like, preferably with a suitable acid catalyst which is activated at elevated temperature such as benzene sulfonic acid and sulfamic acid and preferably with a surface active agent to aid in forming a film of the composition. A variety of catalysts and surface active agents can be employed and are commercially available.

The coating composition can be applied to a suitable substrate by conventional means such as spraying, dipping and the like. The thickness of the coating is not critical but will generally be between about 0.05 mil and about 0.5 mil for a substrate of between about 1 mil and about 0.5 inches. After application, the reaction can be accomplished at a temperature between about 100° and about 150° C. in a period of from 15 minutes to about four hours in an air oven. The resultant article is then resistant to UV degradation and it is found that the benzophenone does not leach out as it is reacted within the composition.

Among the materials which can be protected by the compositions of the invention are those which are readily degraded by UV light such as, for example, polycarbonates, polycarbonate-polysiloxane copolymers, polystyrene, polyvinyl chloride, ABS polymers, poly(2,6-dimethylphenylene oxide) alone or copolymerized with high impact polystyrene, or even wood.

The following examples will serve to illustrate the invention, but are not meant to be limiting. All parts and percentages in said examples and elsewhere in the specification and claims are by weight unless otherwise indicated.

A coating blend of 750 parts of hexamethoxymethylmelamine and a like amount of caprolactone polyol (Nyax Polyol PCP-0300) was mixed with 7.5 parts surface active agent (Mallinckrodt BYK-300) and catalyzed with 1.5% of p-toluene sulfonic acid. The reaction mixture was then diluted with 1500 parts N-butanol to 50% solids and a 10 mil Lexan polycarbonate sheet cleaned with isopropanol dipped into this coating blend, withdrawn slowly and allowed to drain for 5 minutes at room temperature to permit the solvent to evaporate. The coated sheet was cured for an hour at 125° C. in a circulating air oven.

The above procedure was repeated several times but for the exception that to 600 parts of the above mixture was added one of the following UV-stabilizers in the amount indicated.

EXAMPLES 1–7

Example 1: 15 parts (5% on solids) 2,4-dihydroxybenzophenone (DHBP)

Example 2: 15 parts (5% on solids) Resorcinol mono benzoate

Example 3: 15 parts (5% on solids) 2(2'-hydroxy-5'-octylphenyl)benzotriazole (Cyasorb 5411)

Example 4: 9 parts (3% on solids) 2,4-dihydroxybenzophenone (DHBP)

Example 5: 9 parts (3% on solids) 2-hydroxy-4-n-octoxybenzophenone (Cyasorb UV 531)

Example 6: 9 parts (3% on solids) ethyl-2-cyano-3,3-diphenyl acrylate (Uvinul N-35)

Example 7: 9 parts (3% on solids) 2-cyano-3,3-diphenyl acrylic acid

Lexan polycarbonate panels coated with the various blends of samples 1, 2 and 3 were exposed to UV light from RS sunlamps. The protection afforded by the various screeners is most easily seen by the change in yellowness index (ΔYI) of the various samples. The sample number 1 had the lowest ΔYI of 1.66 while sample number 2 had a ΔYI of 13.63 compared to 13.68 for an unprotected control and sample number 3 had a ΔYI of 3.74. The change in yellowness was determined by the method of ASTM D-1925-70 for samples tested for 1000 hours.

Ten mil Lexan polycarbonate film samples were then coated on one side with one of the coating blends of Examples 4, 5, 6 and 7 and allowed to air dry for 30 minutes at room temperature (25°–30° C.). The UV absorbances of these uncured coatings were measured with a UV-spectrometer before and after curing for 1 hour at 125° C. The coated films were then baked for 50 hours at 125° C. while UV-absorbance measurements were taken at intervals.

| Sample | Peak λ | Uncured | Absorbance Cured 1 hr | Baked 3 hrs | Baked 13 hrs | Baked 20 hrs | Baked 50 hrs |
|---|---|---|---|---|---|---|---|
| 4 | 328 nm | 2.391 | 2.184 | 2.090 | 2.184 | 2.223 | 2.226 |
| 5 | 293 nm | 2.283 | 1.468 | 1.086 | 0.650 | 0.557 | 0.539 |
| 6 | 305 nm | 2.592 | 0.253 | 0.041 | 0.053 | 0.059 | 0.070 |
| 7 | 304 nm | 2.568 | 2.700 | 2.625 | 1.905 | 1.276 | 0.275 |

From an examination of the data it can be seen that the composition of the invention, sample 4, is considerably more resistant to thermal degradation after an extended period of 50 hours.

In repeating the examples, similar results are achieved with other benzophenones of the invention, such as 2,3-dihydroxybenophenone, 2,5-dihydroxybenzophenone, 2-hydroxy-5-aminobenzophenone, 2-hydroxy-4'-aminobenzophenone, 2,2',4,4'-tetrahydroxybenzophenone and 2,4-dihydroxynaphthophenone; and with polyols such as polyvinyl alcohol, ethylene glycol, and propylene glycol; melamine compounds such as hexa(ethoxymethyl)melamine and polymers such as a copolymer of Lexan polycarbonate and polydimethylsiloxane.

What I claim as new and desire to secure, by Letters Patent of the United States is:

1. A composition resistant to ultraviolet radiation when cured consisting essentially of by weight
   (A) from about 20% to 80% of a melamine compound having the formula

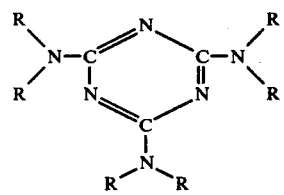

wherein the R groups are independently selected from H, —CH$_2$OH, and —CH$_2$O(CH$_2$)$_x$H groups, wherein x is an integer from 1 to 4,
   (B) from 80% to 20% of a polyol and
   (C) a stabilizing amount of a benzophenone of the formula,

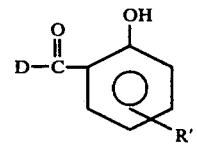

wherein R' is selected from —OH and —NH$_2$ groups in the 3,4 or 5 positions of the ring, and D is an aromatic radical of less than 4 six membered rings which can be substituted with —OH and —NH$_2$ groups.

2. The composition of claim 1 where the polyol is an aliphatic straight chain polyol.

3. The composition of claim 2, wherein the melamine nucleus compound is hexa(methoxymethyl)melamine.

4. The composition of claim 2, wherein the melamine nucleus compound is hexa(methylol)melamine.

5. The composition of claim 2, wherein the benzophenone is 2,4-dihydroxybenzophenone.

6. The composition of claim 1, wherein D is a benzene radical.

7. An article comprising a substrate and a surface coating of a transparent ultraviolet light resistant polymer consisting essentially of the reaction product of
(A) from about 20% to 80% of a melamine compound having the formula,

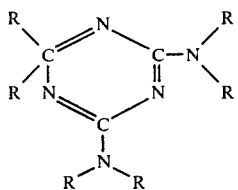

wherein the R groups are independently selected from H, —CH$_2$OH, and —CH$_2$O(CH$_2$)$_x$H groups, wherein x is an integer from 1 to 4,
(B) from 80% to 20% of a polyol and
(C) a stabilizing amount of a benzophenone of the formula,

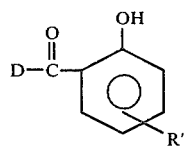

wherein R' is selected from —OH and —NH$_2$ groups in the 3,4 or 5 positions of the ring, and D is an aromatic radical of less than 4 six membered rings which can be substituted with —OH and —NH$_2$ groups.

8. The coating of claim 7 wherein the additional compound is an aliphatic straight chain polyol.

9. A coating of claim 8 wherein the melamine nucleus compound is hexa(methoxymethyl)melamine.

10. A coating of claim 8 wherein the melamine nucleus compound is hexa(methylol)melamine.

11. A coating of claim 8 wherein the benzophenone compound is 2,4-dihydroxybenzophenone.

12. The article of claim 7 wherein the substrate is a transparent polycarbonate resin.

13. A process for inhibiting the UV light degradation of a UV light degradable substrate comprising
(1) coating said substrate with a mixture consisting essentially of by weight
(A) from about 20% to 80% of a melamine compound having the formula,

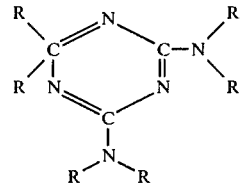

wherein the R groups are independently selected from H, —CH$_2$OH, and —CH$_2$O(CH$_2$)$_x$H groups, wherein x is an integer from 1 to 4,
(B) from 80% to 20% of a polyol and
(C) a stabilizing amount of a benzophenone of the formula,

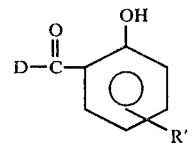

wherein R' is selected from —OH and —NH$_2$ groups in the 3,4 or 5 positions of the ring, and D is an aromatic radical of less than 4 six membered rings which can be substituted with —OH and —NH$_2$ groups, and
(2) heating said mixture to effect reaction.

14. The process of claim 13 wherein the film is between about 0.05 mils and about 0.5 mils.

* * * * *